United States Patent [19]

König et al.

[11] 4,118,556

[45] Oct. 3, 1978

[54] PROCESS FOR THE PRODUCTION OF ACRYLONITRILE-VINYL-CHLORIDE COPOLYMERS WITH IMPROVED WHITENESS

[75] Inventors: Joachim König, Schildgen; Carlhans Süling, Odenthal-Hahnenberg, both of Germany

[73] Assignee: Bayer Aktiengesellschaft, Leverkusen, Germany

[21] Appl. No.: 749,779

[22] Filed: Dec. 13, 1976

Related U.S. Application Data

[63] Continuation of Ser. No. 606,583, Aug. 21, 1975, abandoned.

[30] Foreign Application Priority Data

Aug. 22, 1974 [DE] Fed. Rep. of Germany ...... 2440259

[51] Int. Cl.$^2$ .................. C08F 220/44; C08F 4/40
[52] U.S. Cl. .................................. 526/229; 260/881; 526/229.5; 526/342; 526/915
[58] Field of Search .................. 526/342, 915, 229; 260/881

[56] References Cited

U.S. PATENT DOCUMENTS

| | | | |
|---|---|---|---|
| 2,992,209 | 7/1961 | Webb et al. | 260/79.3 MV |
| 3,002,956 | 10/1961 | Perri | 526/229 |
| 3,053,806 | 9/1962 | LaCombe et al. | 260/79.3 MV |
| 3,123,588 | 3/1964 | Lunney | 260/79.3 MV |
| 3,202,641 | 8/1965 | Nakajima et al. | 260/79.3 MV |

*Primary Examiner*—Herbert J. Lilling
*Attorney, Agent, or Firm*—Plumley and Tyner

[57] ABSTRACT

The invention relates to a process for the production of chemically uniform acrylonitrile-vinyl chloride copolymers with improved whiteness and improved thermal stability comprising from 25 to 60% by weight of acrylonitrile and from 40 to 75% by weight of vinyl chloride and, optionally, up to 15% by weight of other copolymerized ethylenically unsaturated compounds by emulsion polymerization using a redox catalyst of persulphate and compounds of sulphurous acid, wherein the ratio by weight of reducing component to oxidizing component is at least 4 : 1 and wherein polymerization is carried out at a pH-value in the range of from 2.5 to 4.

1 Claim, No Drawings

PROCESS FOR THE PRODUCTION OF ACRYLONITRILE-VINYL-CHLORIDE COPOLYMERS WITH IMPROVED WHITENESS

This is a continuation of application Ser. No. 606,583 filed Aug. 21, 1975, now abandoned.

This invention relates to a process for the production of copolymers comprising from 25 to 60% of acrylonitrile and from 40 to 75% of vinyl chloride and, optionally, other copolymerisable compounds with improved whiteness and improved thermal stability.

Acrylonitrile and vinyl chloride copolymers are suitable for the production of filaments and fibres, so-called modacrylic fibres. In addition to the customary favourable properties, modacrylic fibres, by virtue of their chlorine content, are highly flameproof which makes them eminently suitable for use in the manufacture of wigs, artificial furs, children's clothing, carpets, decorative materials, curtaining and covering fabrics, etc.

Several processes for copolymerising acrylonitrile and vinyl chloride by emulsion polymerisation are described in the literature.

The copolymerisation of acrylonitrile and vinyl chloride is characterised by the different reactivity of the 2 monomers, the acrylonitrile being considerably more reactive than the vinyl chloride (S. J. Brandrup and E. H. Immergut, Polymer Handbook, Interscience Publ., New York 1966). Any polymerisation reaction in which the entire monomer mixture is introduced at the beginning results in the formation of extremely non-uniform products which are unsuitable for use as a fibre material, because, to begin with, polymers rich in acrylonitrile are formed whereas, towards the end of the polymerisation reaction, when the concentration of acrylonitrile decreases, the polymers obtained are extremely rich in vinyl chloride. The individual components of the polymer mixture are not compatible with one another, and it is not possible to prepare useful spinning solutions. In order to obtain chemically uniform polymers with a specific AN : VC ratio, polymerisation has to be carried out semi-continuously with a certain monomer ratio AN : VC adjusted at the beginning of the polymerisation reaction. This monomer ratio is kept constant by replenishing the more quickly consumed acrylonitrile and, optionally, other monomeric components and the initiator.

Accordingly, the polymerisation reaction is carried out in the presence of an excess of vinyl chloride, the total amount of vinyl chloride generally being added at the beginning of polymerisation. In some cases, however, some of the vinyl chloride may even be added while the polymerisation reaction is in progress.

The emulsion polymerisation of acrylonitrile and vinyl chloride can be activated with conventional water-soluble catalysts, such as persulphates or hydrogen peroxide. However, in order to obtain an adequate polymerisation velocity, even at low temperatures, it has proved to be favourable to activate the reaction with redox systems such as, for example, persulphates together with reducing components such as amines, mercaptans or compounds of tetravalent sulphur. It has proved to be particularly effective to activate polymerisation with persulphates and compounds of sulphurous acid, such as pyrosulphite, hydrogen sulphite, sulphite acid or sulphur dioxide in the form of sulphurous acid anhydride. According to the prior art, the oxidising and reducing component are used in a substantially equivalent quantitative ratio in cases where this redox system is used, or alternatively the oxidising component is used in excess in order to guarantee a uniform polymerisation reaction.

According to Example A of Canadian Patent Specification No. 704,778 for example, 0.044 parts of potassium persulphate and 0.044 parts of sulphur dioxide are added at the beginning of polymerisation, whilst another 2.7 parts of potassium persulphate and 2.7 parts of sulphur dioxide are added during polymerisation. In other words, a ratio of exactly 1 : 1 is maintained between persulphate and sulphur dioxide. In Example 1 of the same Patent Specification, 1.5 parts of potassium persulphate and 1.85 parts of sodium bisulphite are used, whereas in Example 2, 2.61 parts of potassium sulphate and 2.24 parts of sodium bisulphite are used.

According to East German Patent Specification No. 45,280, 60 parts of potassium persulphate and 20 parts of sodium pyrosulphite, i.e. an excess of the oxidising component, are used.

In order to ensure that polymerisation is unaffected by fluctuations in pH, a buffer system is frequently added to the polymerisation mixture with a view to adjusting a certain pH-value. Thus, East German Patent Specification No. 45,280 for example discloses a buffer system of sodium hydroxide and phosphoric acid which is said to adjust the pH to a value of from 4.4 to 4.8.

It is possible by this process to obtain polymers from which filaments and fibres with favourable textile properties can be obtained. Unfortunately, one disadvantage of the polymers obtained in this way is their unsatisfactory whiteness and their poor thermal stability, i.e. their low colour stability under the effect of relatively high temperatures, so that stabilisers have to be added during spinning of the polymers. Even then, the filaments obtained have a yellowish natural colour.

Attempts have been made to obviate this disadvantage by carrying out polymerisation at low temperatures in the presence of special catalysts. Thus, Japanese Patent Specification No. 37-8994/1962 relates to a process for the low-temperature polymerisation of acrylonitrile and vinyl chloride with a catalyst system of water-soluble peroxides and dihydroxy maleic acid, polymers with improved whiteness being obtained. Unfortunately, polymerisation at low temperatures only allows slow polymerisation velocities and poor volume-time yields so that these processes are not economic.

One disadvantage of carrying out polymerisation in the presence of a buffer system is that the concentration of electrolyte in the polymerisation vessel is increased by the buffer system, thus adversely affecting the stability of the latex. This reduced stability only allows polymerisation up to low polymer contents of the latex if coagulation is to be avoided. Coagulation would lead to uncontrollable conditions for the further course of polymerisation, would complicate working up to a considerable extent and would reduce product quality.

According to DAS No. 1,224,506, acrylonitrile homopolymers and copolymers containing at least 85% of acrylonitrile are obtained by a process carried out in the manner of precipitation polymerisation with the redox system persulphate/pyrosulphite at a pH-value of no more than 3.8, the ratio by weight of sulphoxy activator to peroxy catalyst being at least 10 : 1. It is possible by this process to obtain polymers with an acrylonitrile content of at least 85% and a good degree of whiteness.

However, the satisfactory outcome of this polymerisation process is dependent upon the adequate solubility in water of the comonomers in order to avoid the formation of heterogeneous, incompatible and unspinnable polymers. For this reason, the process is not suitable for the production of copolymers with acrylonitrile contents of less than 85% or for the production of copolymers of acrylonitrile with comonomers which, like vinyl chloride for example, are not sufficiently soluble in water.

It has now been found that copolymers comprising from 25 to 60% of acrylonitrile and from 40 to 75% of vinyl chloride and optionally up to 15% of other copolymerisable compounds can be obtained with improved whiteness and improved thermal stability and with a high degree of chemical uniformity by carrying out the copolymerisation reaction in the manner of emulsion polymerisation with a redox system of persulphate and compounds of sulphurous acid and (1) maintaining a ratio by weight of reducing to oxidising component of at least 4 : 1, and (2) adjusting the pH to values of from 2.5 to 4 by the addition of acid.

Accordingly, it is an object of this invention to improve the emulsion copolymerisation of acrylonitrile and vinyl chloride and, optionally, other monomers.

It is another object to provide acrylonitrile/vinyl chloride copolymers with improved whiteness.

Still another object is to provide acrylonitrile/vinyl chloride copolymers which exhibit improved thermal stabilities.

A still further object is the provision of acrylonitrile/vinyl chloride copolymers with a high degree of chemical uniformity.

Other objects will be evident from the description and the Examples.

These objects are accomplished by carrying out the process for the production of an acrylonitrile-vinyl chloride copolymer comprising from 25 to 60% by weight of acrylonitrile and from 40 to 75% by weight of vinyl chloride and optionally up to 15% by weight of at least one other ethylenically unsaturated compound in copolymerised form by emulsion polymerisation using a redox catalyst of persulphate and compounds of sulphurous acid with the improvement which comprises
1. carrying out the polymerisation with a ratio by weight of reducing component to oxidising component of at least 4 : 1, and
2. carrying out the polymerisation at a pH-value of from 2.5 to 4.

Examples of other copolymerisable ethylenically unsaturated compounds are vinylidene chloride, vinyl bromide, vinyl esters such as vinyl acetate, or acrylic acid and methacrylic acid esters such as methyl methacrylate or methyl acrylate. To produce substantially non-inflammable fibres, it has proved to be particularly favourable to add vinyl bromide which, by virtue of a synergistic effect, enhances the flameproof properties of the filaments and fibres according to the invention.

It is also possible to use a copolymerisable compounds ionic additives which are intended to improve the dyeability of the filaments and fibres, for example styrene sulphonate, allyl sulphonate, methallyl sulphonate, 2-acrylamido-2-methyl propane sulphonate or 2-methacrylamido-2-methyl propane sulphonate.

Persulphates, especially alkali persulphates, such as potassium, sodium or ammonium persulphate, are used as the oxidising component in the process according to the invention. The reducing component is selected from compounds of sulphurous acid, such as sulphites, hydrogen sulphites and pyrosulphites, more especially alkali salts or sulphur dioxide in the form of sulphurous acid anhydride.

Any strong or medium-strength inorganic or organic acid which is stable in the presence of the redox system may be used as the acid for adjusting the pH-value. Acids such as sulphuric acid, nitric acid, phosphoric acid or acetic acid are preferably used.

The polymerisation reaction is carried out in the presence of preferably anionic emulsifiers such as, for example, alkyl sulphonates or alkyl aryl sulphonates, the alkyl radicals preferably containing from 10 to 14 carbon atoms, sulphuric acid esters, such as for example sodium lauryl sulphate, or sulphosuccinic acid esters, such as for example sodium dioctyl sulphosuccinate.

A latex of acrylonitrile-vinyl chloride copolymer may additionally be added to the polymerisation mixture in order to shorten the induction time of the polymerisation reaction. A latex starter of this kind is described, for example, in German Offenlegungsschrift No. 2,300,713.

In one preferred embodiment, the polymerisation reaction is carried out at temperatures in the range of from 10° to 50° C. in the absence of presence of heavy metal ions, for example iron ions. It is particularly advantageous to carry out polymerisation at temperatures in the range of from 20° to 40° C.

The process according to the invention yields acrylonitrile-vinyl chloride copolymers which are distinguished from polymers obtained by conventional processes by their improved whiteness and improved thermal stability.

Another advantage of the process according to the invention is that latices with a longer pot life and a lower tendency towards coagulation are obtained with it. Accordingly, it is possible by the process according to the invention to produce latices of higher polymer content without any tendency towards coagulation, thus providing for better volume-time yields.

Whereas in conventional processes the tendencey towards coagulation readily results in the formation of waste, leads to wall deposits and to blockages, the process according to the invention avoids the danger of undesirable coagulation during the polymerisation reaction and working up of the polymers, and hence facilitates working up.

The products obtained are soluble for example in acetone, acetonitrile, dimethyl formamide and dimethyl sulphoxide. They show improved whiteness and improved thermal stability, both in solid form and in solution, and have only a limited tendency to give off hydrochloric acid, even at elevated temperatures. The polymers can be processed both by wet spinning and by dry spinning to form substantially non-inflammable fibres and filaments with outstanding textile properties.

The following tests were carried out to demonstrate the improved whiteness and improved colour stability at elevated temperatures:

Test (a): The polymer powders were pressed and the pressings tested in accordance with DIN 5033 for their standard colour values X, Y, Z under standard light, D 65/2° — normal observer. The colour intervals $\Delta E_{AN}$ were calculated from the standard colour values in accordance with DIN 6174 against barium sulphate as standard.

Test (b): 5% solutions of the polymer powders in dimethyl formamide were prepared. The transmission curves of the solutions were measured against dimethyl formamide in a 5 mm cell, and the standard colour values for standard light, D 65/2° — normal observer, were calculated from the curves. The colour intervals Δ $E_{AN}$ were calculated from the standard colour values in accordance with DIN 6174 against the solvent as standard.

Test (c): Films (50 to 100 μm thick) were prepared from the polymer powders and tempered for 1 hour at 140° C. 5% solutions of the films in dimethyl formamide were then prepared. The solutions were tested in the same way as in Test (b).

The process according to the invention is illustrated by the following Examples which are to further illustrate the invention without limiting it and in which parts represent parts by weight.

EXAMPLE 1

22,300 parts of deionised water, 150 parts of sodium pyrosulphite, 112 parts of sodium lauryl sulphate, 0.1 part of iron(II)ammonium sulphate and 1200 parts of a latex of acrylonitrile/vinyl chloride copolymer with a 6% solids content, are introduced into a polymerisation autoclave. The oxygen is displaced by passing nitrogen over, after which 420 parts of acrylonitrile and 7100 parts of vinyl chloride are introduced under pressure and a temperature of 30° C. is adjusted. Polymerisation is initiated by the introduction under pressure of a solution of 10.5 parts of ammonium persulphate and 50 parts of 1 N sulphuric acid in 650 parts of deionised water. Immediately afterwards, 220 parts per hour of acrylonitrile and a solution of 3.0 parts of ammonium persulphate and 14.3 parts of 1 N sulphuric acid in 185 parts of deionised water, are continuously pumped in. A pH-value of 3.6 to 3.8 is spontaneously adjusted during polymerisation. After a polymerisation time of 7 hours, a solids content of 14.5% is reached, a total of 150 parts of sodium pyrosulphite and 31.5 parts of ammonium persulphate having been used. In other words, the ratio of reducing to oxidising component was 4.76 : 1. The latex is let off from the autoclave, a solution of 25 parts of zinc sulphate and 100 parts of concentrated nitric acid in 2000 parts of deionised water is introduced and the product is precipitated by heating to 90° C. Working up gives 3850 parts of a polymer with a chlorine content of 31.80%, a nitrogen content of 10.94% (AN : VC ratio = 42.6 : 57.4) and a K-value of 61.5 (0.5% solution in dimethyl formamide at 25° C.), cf. Fikentscher, Cellulose-chemie 13, 58 (1932).

The above described colour stability tests were carried out on the polymer with the following results:
Test (a) Δ $E_{AN}$ = 2.2
Test (b) Δ $E_{AN}$ = 2.4
Test (c) Δ $E_{AN}$ = 21.5

Comparison Test 1

For comparison, a polymer was prepared in accordance with DT-OS 2,300,713 at a pH-value of 4.6 and with a ratio of sodium pyrosulphite to ammonium persulphate of 0.70:1, the comparison polymer having a chlorine content of 31.55%, a nitrogen content of 10.99% (AN : VC ratio = 42.8 : 57.1) and a K-value of 68.

The colour stability tests carried out with this polymer produced the following results:
Test (a) Δ $E_{AN}$ = 5.5
Test (b) Δ $E_{AN}$ = 7.0
Test (c) Δ $E_{AN}$ = 29.8

In other words, powders and 5% solutions in dimethyl formamide of the comparison polymer were more heavily discoloured. Also, the 5% solution of the comparison polymer tempered at 140° C. was more heavily discoloured than the solution of the Example 1 polymer according to the invention.

EXAMPLE 2

22,300 parts of deionised water, 160 parts of sodium pyrosulphite, 112 parts of sodium lauryl sulphate, 0.1 part of iron(II)ammonium sulphate and 1200 parts of a latex of acrylonitrile-vinyl chloride copolymer with a solids content of 5%, are introduced into a polymerisation autoclave. After nitrogen has been passed over, 420 parts of acrylonitrile and 7100 parts of vinyl chloride are introduced under pressure and a temperature of 32° C. is adjusted. Polymerisation is initiated by introducing under pressure a solution of 12.7 parts of ammonium persulphate and 45 parts of 1 N sulphuric acid in 805 parts of deionised water. 200 parts per hour of acrylonitrile and a solution of 2.7 parts of ammonium persulphate and 9.6 parts of 1 N sulphuric acid in 170 parts of deionised water are then continuously pumped in. A pH-value of 3.5 to 3.7 is automatically adjusted during polymerisation. After a polymerisation time of 10 hours, a solids content of 17% is reached, a total of 160 parts of sodium pyrosulphite and 39.7 parts of ammonium persulphate having been used. In other words, the ratio of reducing to oxidising component was 4.03:1.

The latex is released from the autoclave, a solution of 25 parts of zinc sulphate and 100 parts of concentrated nitric acid in 3000 parts of deionised water is added and the product is precipitated by heating to 90° C. Working up gives 4360 parts of a polymer with a chlorine content of 33.80%, a nitrogen content of 10.29% (AN : VC ratio = 39.6 : 60.4) and a K-value of 61.0.

The colour stability tests carried out on the polymer produced the following results:
Test (a) Δ $E_{AN}$ = 2.7
Test (b) Δ $E_{AN}$ = 2.7
Test (c) Δ $E_{AN}$ = 21.9

Comparison Test 2

For comparison, a polymer was prepared in accordance with DT-OS 2,300,713 at a pH-value of 4.6 and with a ratio of sodium pyrosulphite to ammonium persulphate of 0.60 : 1, the comparison polymer having a chlorine content of 33.45%, a nitrogen content of 10.08% (AN : VC = 39.3 : 60.7) and a K-value of 66.0.

Colour stability tests carried out with this polymer produced the following results:
Test (a) Δ $E_{AN}$ = 4.4
Test (b) Δ $E_{AN}$ = 6.9
Test (c) Δ $E_{AN}$ = 30.2

In other words, powders and 5% solutions in dimethyl formamide of the comparison polymer were more heavily discoloured. Also, the 5% solution of the comparison polymer tempered at 140° C. was more heavily discoloured than the solution of the Example 2 polymer according to the invention.

EXAMPLE 3

22,300 parts of deionised water, 250 parts of sodium pyrosulphite, 112 parts of sodium lauryl sulphate, 0.1 part of iron(II)ammonium sulphate and 1200 parts of a latex of acrylonitrile-vinyl chloride copolymer with a solids content of 5%, are introduced into a polymerisation autoclave. After nitrogen has been passed over, 420 parts of acrylonitrile and 7100 parts of vinyl chloride are introduced under pressure and a temperature of 32° C. is adjusted. Polymerisation is initiated by the introduction under pressure of a solution of 10.1 parts of potassium persulphate and 60 parts of 1 N sulphuric acid in 790 parts of deionised water. 200 parts per hour of acrylonitrile and a solution of 2.1 parts of potassium persulphate and 12.8 parts of 1 N sulphuric acid in 170 parts of deionised water are then continuously pumped in. A pH-value of 3.3 was measured during polymerisation. After a polymerisation time of 7 hours, in which a solids content of 13.5% is reached, a total of 250 parts of sodium pyrosulphite and 24.8 parts of potassium persulphate has been used, in other words the ratio of reducing to oxidising component was 10.1:1. The latex is worked up in the same way as in Example 2, giving 3480 parts of a polymer with a chlorine content of 33.55%, a nitrogen content of 9.83% (AN : VC = 38.6 : 61.4) and a K-value of 61.5.

Measurement of whiteness produced the following results:
Test (a) $\Delta E_{AN} = 2.2$
Test (b) $\Delta E_{AN} = 2.4$

EXAMPLE 4

22,300 parts of deionised water, 150 parts of sodium pyrosulphite, 112 parts of sodium lauryl sulphate and 1200 parts of a latex of acrylonitrile-vinyl chloride copolymer with a 5% solids content are introduced into a polymerisation autoclave. After nitrogen has been passed over, 420 parts of acrylonitrile and 7100 parts of vinyl chloride are introduced under pressure and a temperature of 30° C. is adjusted. The polymerisation reaction is initiated by the introduction under pressure of a solution of 12.7 parts of ammonium persulphate and 60 parts of 1 N sulphuric acid in 790 parts of deionised water. 220 parts per hour of acrylonitrile and a solution of 2.7 parts of ammonium persulphate and 12.8 parts of 1 N sulphuric acid in 170 parts of deionised water are then continuously pumped in. A pH-value of 3.2 to 3.3 was measured during polymerisation. After a polymerisation time of 7 hours, in which a solids content of 10.5% is reached, a total of 150 parts of sodium pyrosulphite and 31.6 parts of ammonium persulphate had been used, in other words the ratio of reducing component to oxidising component was 4.75 : 1. The latex is worked up in the same way as in Example 2, giving 2900 parts of a polymer with a chlorine content of 28.20%, a nitrogen content of 12.91% (AN : VC = 49.6 : 50.4) and a K-value of 73.

Meaurement of whiteness and colour stability produced the following results:
Test (a) $\Delta E_{AN} = 1.9$
Test (b) $\Delta E_{AN} = 1.7$
Test (c) $\Delta E_{AN} = 19.4$

Comparison Test 4

For comparison, a polymer was prepared in accordance with DT-OS 2,300,713 at a pH-value of 4.6 and with a ratio of sodium pyrosulphite to potassium persulphate of 0.6 : 1, the comparison polymer having a chlorine content of 28.60%, a nitrogen content of 12.23% (AN : VC = 48.0 : 52.0) and a K-value of 75.5.

Colour stability testing of this polymer produced the following results:
Test (a) $\Delta E_{AN} = 4.7$
Test (b) $\Delta E_{AN} = 7.9$
Test (c) $\Delta E_{AN} = 35.0$ In other words, powders and 5% solutions in dimethyl formamide of the comparison polymer were more heavily discoloured. Also, the 5% solution of the comparison polymer treated at 140° C. was more heavily discoloured than the solution of the Example 4 polymer according to the invention.

EXAMPLE 5

Example 1 is repeated with all the components used kept constant except for the iron(II)ammonium sulphate which is only used in a quantity of 0.05 part. After a polymerisation time of 7 hours, a solids content of 13.0% is reached. Working up gives 3470 parts of a polymer with a chlorine content of 30.60%, a nitrogen content of 11.79% (AN : VC = 45.4 : 54.6) and a K-value of 64.5.

Colour stability tests carried out with this polymer produced the following results:
Test (a) $\Delta E_{AN} = 1.9$
Test (b) $\Delta E_{AN} = 2.6$
Test (c) $\Delta E_{AN} = 22.4$

Comparison Test 5

Colour stability testing of a polymer for comparison at a pH-value of 4.6 and with a ratio of sodium pyrosulphite to potassium persulphate of 0.53 : 1, this comparison polymer having a chlorine content of 30.3%, a nitrogen content of 11.65% (AN : VC = 45.3 : 54.7) and a K-value of 72.0, produced the following results:
Test (a) $\Delta E_{AN} = 4.3$
Test (b) $\Delta E_{AN} = 6.9$
Test (c) $\Delta E_{AN} 32\ 29.6$

EXAMPLE 6

22,300 parts of deionised water, 150 parts of sodium pyrosulphite, 112 parts of sodium lauryl sulphate, 0.1 part of iron(II)ammonium sulphate and 1200 parts of a latex of acrylonitrile-vinyl chloride copolymer with a solids content of 5%, are introduced into a polymerisation autoclave. After nitrogen has been passed over, 420 parts of acrylonitrile and 7100 parts of vinyl chloride are introduced under pressure and a temperature of 32° C. is adjusted. Polymerisation is initiated by the introduction under pressure of a solution of 15.1 parts of potassium persulphate and 100 parts of 1 N sulphuric acid in 750 parts of deionised water. 200 parts per hour of acrylonitrile and a solution of 3.2 parts of potassium persulphate and 21.3 parts of 1 N sulphuric acid in 160 parts of deionised water are then continuously pumped in. After a polymerisation time of 7 hours at a pH-value of 3.3, a total of 150 parts of sodium pyrosulphite and 37.5 parts of potassium persulphate having been used (ratio of reducing component to oxidising component = 4 : 1), a solids content of 18.0% is reached. Working up in the usual way gives 5310 parts of a polymer with a chlorine content of 38.45%, a nitrogen content of 7.96% (AN : VC = 30.8 : 69.2) and a K-value of 59.

Measurement of the whiteness of this polymer produced the following results:
Test (a) $\Delta E_{AN} = 4.0$
Test (b) $\Delta E_{AN} = 3.8$

EXAMPLE 7

23,500 parts of deionised water, 160 parts of sodium pyrosulphite, 120 parts of sodium alkyl sulphonate with an average chain length of 14 carbon atoms and 0.05 part of iron(II)-ammonium sulphate, are introduced into a polymerisation autoclave. After nitrogen has been passed over, 420 parts of acrylonitrile and 7100 parts of vinyl chloride are introduced under pressure and a temperature of 25° C. is adjusted. The polymerisation reaction is initiated by the introduction under pressure of a solution of 10.1 parts of ammonium persulphate and 50 parts of 1 N sulphuric acid in 650 parts of deionised water. 200 parts per hour of acrylonitrile and a solution of 2.9 parts of ammonium persulphate and 14.3 parts of 1 N sulphuric acid in 185 parts of deionised water are then continuously pumped in. A pH-value of 3.5 is measured during polymerisation. After a polymerisation time of 6 hours, a solids content of 10.0% is reached. A total of 160 parts of sodium pyrosulphite and 27.5 parts of ammonium persulphate have been used, in other words the ratio of reducing component to oxidising component was 5.82 : 1. Working up in the usual way gives 3020 parts of a polymer with a chlorine content of 31.15%, a nitrogen content of 11.40% (AN : VC = 43.9 : 56.1) and a K-value of 71.5.

Measurement of whiteness and colour stability produced the following results:

Test (a) $\Delta E_{AN} = 2.1$
Test (b) $\Delta E_{AN} = 2.1$
Test (c) $\Delta E_{AN} = 23.9$

EXAMPLE 8

22,300 parts of deionised water, 150 parts of sodium pyrosulphite, 112 parts of sodium lauryl sulphate, 0.1 part of iron(II)ammonium sulphate, 60 parts of sodium methallyl sulphonate and 1200 parts of a latex of acrylonitrile-vinyl chloride copolymer with a solids content of 6%, are introduced into a polymerisation autoclave. After nitrogen has been passed over, 420 parts of acrylonitrile and 7100 parts of vinyl chloride are introduced under pressure and a temperature of 30° C. is adjusted. Polymerisation is initiated by the introduction under pressure of a solution of 10.4 parts of ammonium persulphate and 50 parts of 1 N sulphuric acid in 650 parts of deionised water. 200 parts per hour of acrylonitrile and a solution of 3.0 parts of ammonium persulphate and 14.3 parts of 1 N sulphuric acid in 185 parts of deionised water are then continuously pumped in. A pH-value of 3.5 - 3.7 is measured during polymerisation. After a polymerisation time of 7 hours, a solids content of 13.5% is reached. For a total input of 150 parts of sodium pyrosulphite and 31.4 parts of ammonium persulphate, the ratio of reducing component to oxidising component was 4.78 : 1. Working up in the usual way gives 3520 parts of a polymer with a chlorine content of 33.55%, a nitrogen content of 10.19% (AN : VC = 39.6 : 60.4), a sulphur content of 0.26% and a K-value of 60.0.

Measurement of whiteness and colour stability produced the following results:

Test (a) $\Delta E_{AN} = 2.8$
Test (b) $\Delta E_{AN} = 2.8$
Test (c) $\Delta E_{AN} = 24.0$

What we claim is:

1. A process for the improvement of the whiteness and thermal stability of highly chemically uniform copolymers consisting essentially of acrylonitrile and vinyl chloride having an acrylonitrile content of from 25 to 60% by weight and a vinyl chloride content of from 40 to 75% by weight consisting essentially of copolymerizing acrylonitrile and vinyl chloride by emulsion polymerization with a redox catalyst of persulphate and compounds of sulphurous acid wherein the polymerization is conducted at a pH of from 2.5 to 4 and the ratio be weight of reducing to oxidizing component is maintained at at least 4:1 to provide an acrylonitrile/vinyl chloride copolymer having an acrylonitrile content of from 25 to 60% by weight and a vinyl chloride content of from 40 to 75% by weight.

* * * * *